US012050419B2

(12) United States Patent
Suzuki et al.

(10) Patent No.: US 12,050,419 B2
(45) Date of Patent: Jul. 30, 2024

(54) IMAGE FORMING APPARATUS

(71) Applicant: CANON KABUSHIKI KAISHA, Tokyo (JP)

(72) Inventors: Ai Suzuki, Tokyo (JP); Osamu Sasaoka, Kanagawa (JP); Kensuke Umeda, Kanagawa (JP); Shinsuke Kobayashi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/462,197

(22) Filed: Sep. 6, 2023

(65) Prior Publication Data

US 2023/0418192 A1 Dec. 28, 2023

Related U.S. Application Data

(63) Continuation of application No. 18/057,058, filed on Nov. 18, 2022, now Pat. No. 11,782,365, which is a (Continued)

(30) Foreign Application Priority Data

Dec. 7, 2020 (JP) ................................ 2020-202978

(51) Int. Cl.
*G03G 15/20* (2006.01)

(52) U.S. Cl.
CPC ..... *G03G 15/2028* (2013.01); *G03G 15/2064* (2013.01); *G03G 2215/00548* (2013.01)

(58) Field of Classification Search
CPC ........... G03G 15/2028; G03G 15/2064; G03G 2215/00548
See application file for complete search history.

(56) References Cited

U.S. PATENT DOCUMENTS 10,836,599 B2 * 11/2020 Shimmachi ............ B65H 31/02
2014/0227012 A1 * 8/2014 Honda ............... G03G 15/2028 399/322

(Continued)

FOREIGN PATENT DOCUMENTS

JP H04170567 A 6/1992
JP 2000072282 A 3/2000

(Continued)

*Primary Examiner* — Sevan A Aydin
(74) *Attorney, Agent, or Firm* — Canon U.S.A., Inc. IP Division

(57) ABSTRACT

An image forming apparatus includes an image forming unit, a fixing unit, first and second rotating members, and a discharge unit to discharge a recording material to an outside. The fixing unit fixes an image from the image forming unit onto the recording material. The first rotating member comes into contact with and guides the image bearing recording material, and is driven to rotate by conveyance of the recording material. The second rotating member comes into contact with the image bearing recording material more on a downstream side than the first rotating member in a conveyance direction of the recording material, guides the recording material, and is driven to rotate by conveyance of the recording material. The first rotating member does not perform swinging motion by coming into contact with the recording material, and the second rotating member performs swinging motion by coming into contact with the recording material.

8 Claims, 12 Drawing Sheets

Related U.S. Application Data continuation of application No. 17/539,856, filed on Dec. 1, 2021, now Pat. No. 11,531,292.

(56) References Cited

U.S. PATENT DOCUMENTS

| | | | | |
|---|---|---|---|---|
| 2015/0234323 | A1* | 8/2015 | Furukawa | G03G 15/0887<br>399/274 |
| 2017/0108815 | A1* | 4/2017 | Yoneda | B65H 29/52 |
| 2018/0136595 | A1* | 5/2018 | Koyama | G03G 15/2028 |
| 2019/0039844 | A1* | 2/2019 | Kurita | B65H 3/56 |

FOREIGN PATENT DOCUMENTS

| | | | | | |
|---|---|---|---|---|---|
| JP | 2000155493 | A | | 6/2000 | |
| JP | 2013015548 | A | | 1/2013 | |
| JP | 2023145280 | A | * | 10/2023 | G03G 15/5062 |

* cited by examiner

IMAGE FORMING APPARATUS

CROSS REFERENCE TO RELATED APPLICATIONS

The present application is a continuation of U.S. patent application Ser. No. 18/057,058, filed on Nov. 18, 2022, which is a continuation of U.S. patent application Ser. No. 17/539,856, filed on Dec. 1, 2021 and issued as U.S. Pat. No. 11,531,292 on Dec. 20, 2022, which claims the benefit of Japanese Patent Application No. 2020-202978, filed Dec. 7, 2020, each of which is hereby incorporated by reference herein in its entirety.

BACKGROUND

Field

The present disclosure relates to image forming apparatuses such as a copy machine, a laser beam printer, and a light emitting diode (LED) printer.

Description of the Related Art

In an image forming apparatus, sensors for detecting a conveyance state of a recording material have been conventionally arranged on a conveyance path of the recording material. One of sensors is arranged immediately after a fixing device, and detects the conveyance state of the recording material onto which an image is fixed. Such a sensor is also called a paper discharge sensor. For example, the paper discharge sensor is capable of detecting whether a winding jam, in which the recording material is wound around a fixing roller or a fixing film, does not occur. In addition, the paper discharge sensor is capable of detecting passage of the recording material through the paper discharge sensor, and also capable of performing control to reverse the recording material to a double-sided conveyance path. Such a paper discharge sensor is urged by a spring and is configured as a flag that performs swinging motion by the recording material being conveyed to a detection area of the paper discharge sensor.

In this manner, since the paper discharge sensor rubs against the recording material, there is a possibility that an image formed on the recording material is scraped away and image quality is thereby degraded. To address this, Japanese Patent Application Laid-Open No. 2000-72282 discusses a configuration of arranging a roller being driven to rotate at a leading end portion of a paper discharge sensor that comes into contact with a recording material to prevent degradation in image quality.

Japanese Patent Application Laid-Open No. 2000-72282 discusses a configuration in which the recording material that has passed through a fixing device is detected by the paper discharge sensor without changing a conveyance direction and is conveyed to a paper discharge roller. However, like an image forming apparatus 1000 illustrated in FIG. 9, there is a configuration in which the conveyance direction of the recording material that has passed through a fixing device 1056 is switched from a first conveyance direction to a second conveyance direction, and the recording material is thereafter conveyed to a paper discharge roller 1014. Such an image forming apparatus is demanded to convey the recording material from the fixing device 1056 to the paper discharge roller 1014 while preventing occurrence of a conveyance malfunction and degradation of image quality. Although arranging a member as discussed in Japanese Patent Application Laid-Open No. 2000-72282 after the fixing device 1056 may be able to prevent the degradation of image quality, the image forming apparatus is also demanded to convey the recording material while preventing the occurrence of the conveyance malfunction.

SUMMARY

According to an aspect of the present disclosure, an image forming apparatus includes an image forming unit configured to form an image on a recording material, a fixing unit configured to fix the image that has been formed by the image forming unit onto the recording material, a first rotating member configured to come into contact with the recording material onto which the image has been fixed and guide the recording material, and configured to be driven to rotate by conveyance of the recording material, a second rotating member configured to come into contact with the recording material onto which the image has been fixed more on a downstream side than the first rotating member in a conveyance direction of the recording material and guide the recording material, and configured to be driven to rotate by conveyance of the recording material, and a discharge unit configured to discharge the recording material guided by the first rotating member and the second rotating member to an outside of the image forming apparatus, wherein the first rotating member is configured not to perform swinging motion by coming into contact with the recording material, and the second rotating member is configured to perform swinging motion by coming into contact with the recording material.

Further features of the present disclosure will become apparent from the following description of exemplary embodiments with reference to the attached drawings.

DESCRIPTION OF THE EMBODIMENTS

A first exemplary embodiment of the present disclosure will be described below with reference to the accompanying drawings. Exemplary embodiments described below do not limit the scope of the disclosure, and not all combinations of features described in the exemplary embodiments are necessarily essential.

[Overall Configuration of Image Forming Apparatus 50]

Figure 1:
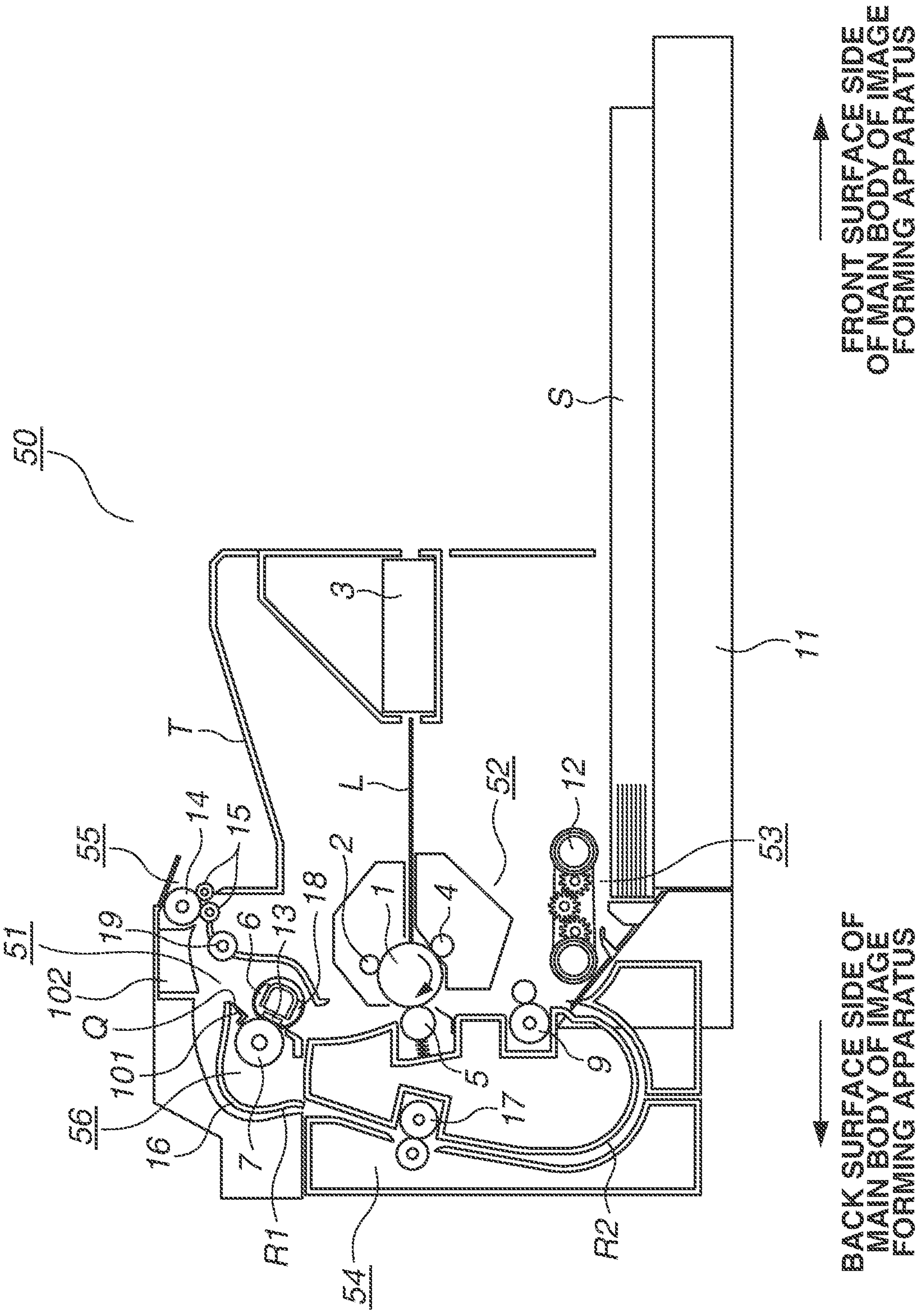
FIG. 1 is a schematic configuration diagram illustrating an image forming apparatus.

FIG. 1 is a schematic configuration diagram illustrating an image forming apparatus 50. An overall configuration of the image forming apparatus 50 will be described first, and the overall flow of an image forming operation will be subsequently described. In FIG. 1, the image forming apparatus 50 includes the following members. The image forming apparatus 50 includes an image forming portion 52 as an image forming unit, and a paper feeding portion 53 that feeds a recording material S, which is, for example, paper, to the image forming portion 52. The image forming apparatus 50 further includes a fixing portion 56, which is a fixing device serving as a fixing unit that fixes an image formed by the image forming portion 52 onto the recording material S, and a paper discharge guide portion 51 for guiding the recording material S onto which the image is fixed by the fixing portion 56 to a paper discharge portion 55. The image forming apparatus 50 also includes the paper discharge portion 55 that discharges the recording material S to the outside of the image forming apparatus 50 or reverses the recording material S, on one side of which the image is formed, and a reverse conveyance portion that conveys the recording material S reversed by the paper discharge portion 55 to the image forming portion 52 again.

The image forming portion 52 includes a photosensitive drum 1 as an image bearing member, a charging roller 2 that uniformly charges the photosensitive drum 1 at a predetermined potential, and a laser scanner 3 that forms an electrostatic latent image on the photosensitive drum 1. The image forming portion 52 further includes a development roller 4 that develops the electrostatic latent image formed on the photosensitive drum 1 as a toner image (hereinafter also referred to as an image), and a transfer roller 5 that transfers the image on the photosensitive drum 1 onto the recording material S.

The paper feeding portion 53 includes a paper feeding tray 11 on which the recording material S is stacked, and a feeding roller 12 that feeds the recording material S on the paper feeding tray 11 one sheet by one sheet.

The fixing portion 56 includes a heater 13 as a heat source, a heater holder 18 that holds the heater 13, and a fixing film 6 that incorporates the heater 13 and the heater holder 18. The fixing portion 56 further includes a pressure roller 7 that forms, together with the heater 13, a fixing nip portion, in a state of being in pressure-contact with the heater 13 and the heater holder 18 via the fixing film 6 and nipping the fixing film 6. The image on the recording material S is fixed by being heated by the fixing nip portion, which is formed between the fixing film 6 and the pressure roller 7, via the fixing film 6.

The paper discharge guide portion 51 includes two guides that come into contact with a leading end of the recording material S, onto which the image is fixed by the fixing portion 56, or a non-image formation surface of the recording material S. An after-fixing guide 101 is arranged immediately after the fixing portion 56 and guides conveyance of the recording material S. An after-fixing upper guide 102 is a guide that is arranged closer to the paper discharge portion 55 than the after-fixing guide 101 is to the paper discharge portion 55 and is arranged on the upper side of the main body of the image forming apparatus 50, and that has a shape of protruding upward.

The paper discharge portion 55 as a discharge unit includes a paper discharge roller 14 and paper discharge rollers 15. The paper discharge roller 14 discharges the recording material S, which has undergone all of image forming processes, to the outside of the image forming apparatus 50. The paper discharge rollers 15 face the paper discharge roller 14 and are driven to rotate. The paper discharge portion 55 further includes a paper discharge tray T, on which the discharged recording material S discharged by the paper discharge roller 14 is stacked. The paper discharge roller 14 is capable of switching a rotational direction (performing switch-back conveyance), and also capable of switching back the recording material S having undergone the image forming processes on a first side and conveying the recording material S to a reverse conveyance portion 54.

The reverse conveyance portion 54 includes a re-conveyance roller pair 17 for conveying the recording material S that has been reversed and conveyed by the paper discharge roller 14, and a double-sided conveyance guide 16 for guiding the recording material S to the re-conveyance roller pair 17. The reverse conveyance portion 54 further includes an upstream side reverse conveyance path R1 for conveying the recording material S to the re-conveyance roller pair 17, and a reverse lower guide roller 19 that lifts the leading end of the recording material S (a trailing end of the first side in the conveyance direction) upward to guide the leading end of the recording material S, when reversed, to the double-sided conveyance guide 16. The reverse conveyance portion 54 further includes a downstream side reverse conveyance path R2 that is arranged on the more downstream side in the conveyance direction of the recording material S than the re-conveyance roller pair 17, and that has a substantially U-shape.

[Image Forming Operation of Image Forming Apparatus 50]

Subsequently, an image forming operation of the image forming apparatus 50 is described. When the image forming operation is started, first, the feeding roller 12 starts to rotate in accordance with a paper feeding start signal from a controller, which is not illustrated, and feeds the recording material S stacked on the paper feeding tray 11. The recording material S fed by the feeding roller 12 is conveyed by a conveyance roller 9 arranged on the upstream side in the conveyance direction of the recording material S. When the recording material S conveyed by the conveyance roller 9 is detected by a registration sensor, which is not illustrated, the controller, after the elapse of a predetermined time, emits laser light L based on image information from the laser scanner 3.

When the image forming operation is started, the photosensitive drum 1 rotates in a direction of an arrow, and is uniformly charged by the charging roller 2 to have a predetermined polarity at a predetermined potential. When the photosensitive drum 1, the surface of which is charged, is irradiated with the laser light L, an electrostatic-latent image is formed on the photosensitive drum 1. The electrostatic latent image is developed with toner by the development roller 4 and visualized as an image. The visualized image on the photosensitive drum 1 is transferred onto the recording material S by the transfer roller 5.

The recording material S onto which the image is transferred is conveyed to the fixing portion 56. The fixing nip portion formed between the fixing film 6 and the pressure roller 7 conveys the recording material S, heats and applies pressure to the image formed on the recording material S, and thereby fixes the image onto the recording material S. The recording material S onto which the image is fixed is changed in trajectory of the leading end thereof by the after-fixing guide 101 and the after-fixing upper guide 102 of the paper discharge guide portion 51 gradually toward the paper discharge portion 55. The recording material S guided to the paper discharge portion 55 is discharged by the paper discharge roller 14 to the outside of the image forming apparatus 50, and is stacked onto the paper discharge tray T.

In a case where an image is formed on both sides of the recording material S, the image forming apparatus 50 performs the following double-sided printing. When a reverse sensor, which is arranged between the fixing portion 56 and the paper discharge roller 14 and is not illustrated, detects the trailing end of the recording material S, the controller rotates the paper discharge roller 14 in an opposite direction after the trailing end of the recording material S passes through a leading end Q of the after-fixing guide 101. At this time, the trailing end of the recording material S is in a state of being lifted to an upper side of the main body of the image forming apparatus 50 by the two paper discharge rollers 15 arranged facing the paper discharge roller 14.

For example, in a case where the recording material S is paper with low stiffness, such as thin paper, or is curled, there is a case where the trailing end of the recording material S tends to sag toward the fixing portion 56 side. In such a case, the image forming apparatus 50 is configured so that the trailing end of the recording material S is lifted upward by the reverse lower guide roller 19 arranged more on the upper side than the leading end Q of the after-fixing guide 101. The reverse lower guide roller 19 is arranged on the first side of the recording material S on which the image is formed. Since there is a possibility that the image is scratched by the reverse lower guide roller 19 contacting with the surface of the recording material S, the reverse lower guide roller 19 has such a roller shape as that the reverse lower guide roller 19 can be driven to rotate in step with the conveyance of the recording material S.

With such a configuration, the leading end of the recording material S (the trailing end of the first side) can be conveyed to the double-sided conveyance guide 16, and the recording material S is conveyed to the upstream side reverse conveyance path R1 along the double-sided conveyance guide 16. After passing through the upstream side reverse conveyance path R1 and reaching the re-conveyance roller pair 17, the recording material S is conveyed by the re-conveyance roller pair 17, passes through the downstream side reverse conveyance path R2, and is guided by the conveyance roller 9. The recording material S is then conveyed to the image forming portion 52 again, and an image is formed on a second side. The recording material S on which the image has been formed on the second side thereof, undergoes fixing by the fixing portion 56 again, is thereafter discharged to the outside of the image forming apparatus 50 by the paper discharge roller 14, and is stacked onto the paper discharge tray T.

[Configuration of Paper Discharge Guide Portion]

Figure 2:
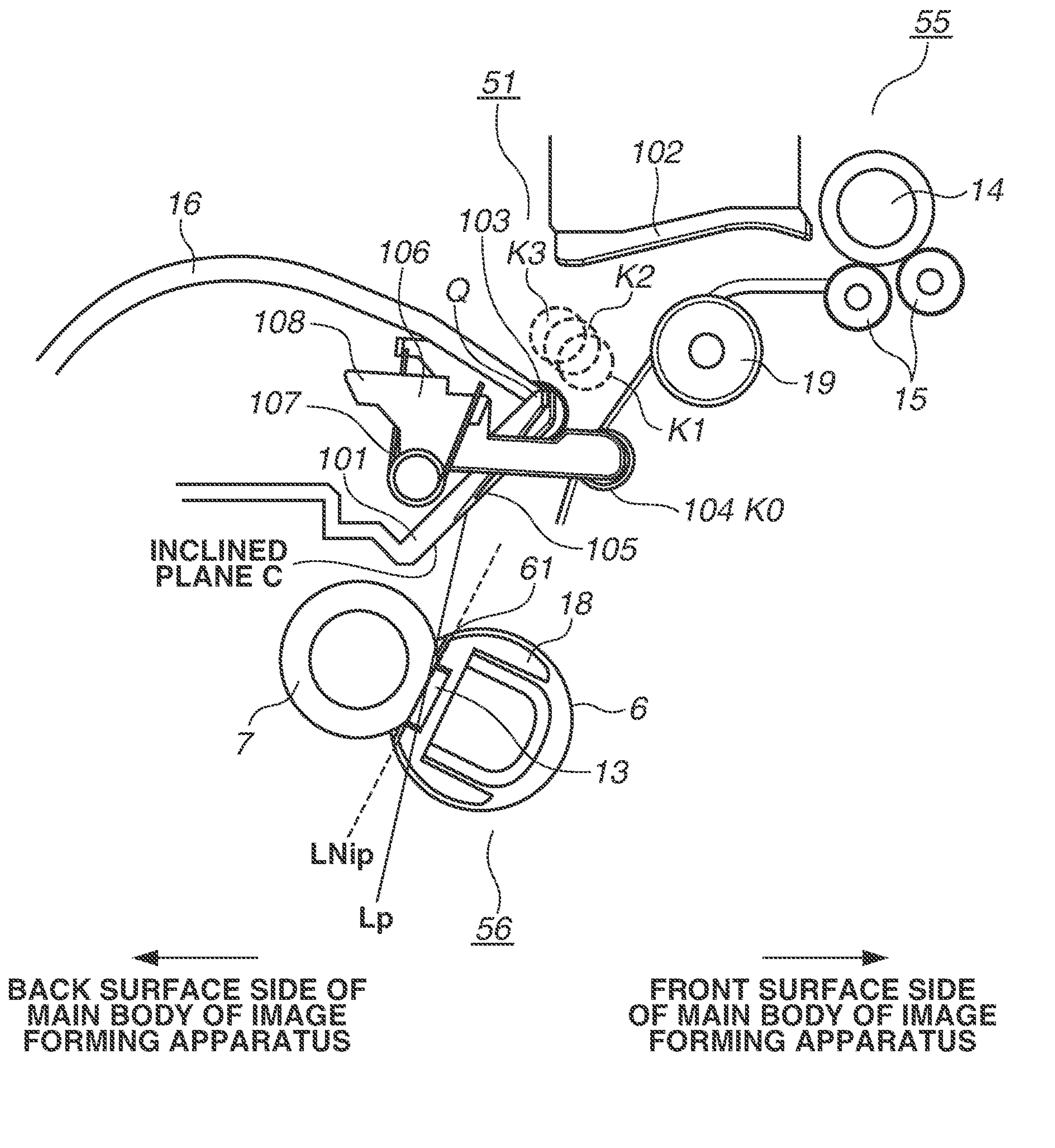
FIG. 2 is a schematic configuration diagram illustrating a fixing portion, a paper discharge guide portion, and a paper discharge portion in an enlarged manner.
Figure 3:
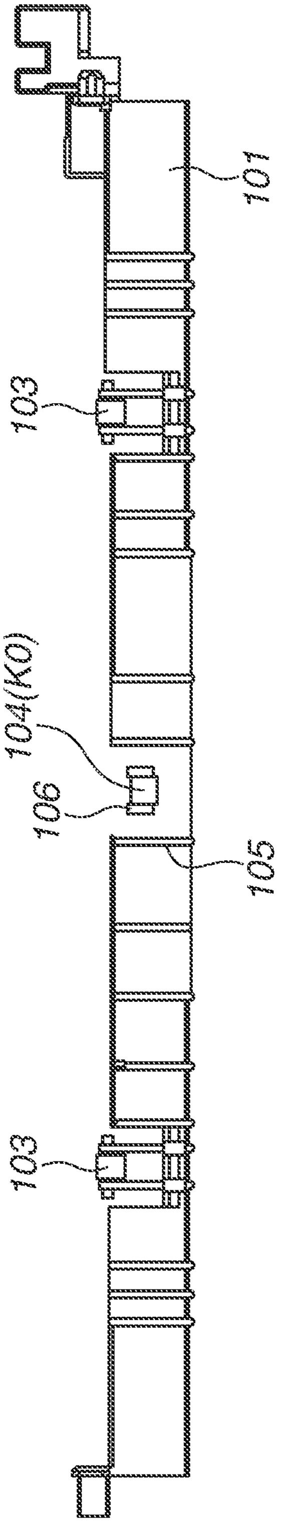
FIG. 3 is a schematic diagram illustrating an after-fixing guide when viewed from a front surface side of a main body of the image forming apparatus.

Detailed configurations of the after-fixing guide 101 and the after-fixing upper guide 102 of the paper discharge guide portion 51 are described with reference to FIGS. 2 and 3. FIG. 2 is a schematic configuration diagram illustrating the fixing portion 56, the paper discharge guide portion 51, and the paper discharge portion 55 in an enlarged manner. FIG. 3 is a schematic diagram illustrating the after-fixing guide 101 when viewed from the front surface side of the main body of the image forming apparatus 50.

The after-fixing guide 101 is arranged immediately after the fixing nip portion, and guides the leading end of the recording material S discharged from the fixing nip portion to the after-fixing upper guide 102. In the present exemplary embodiment, the recording material S onto which the image has been fixed by the fixing nip portion is discharged along a fixing discharge line Lp, which is inclined by about 6 degrees with respect to a fixing nip tangent line LNip and illustrated in FIG. 2. This is because the heater holder 18 incorporated in the fixing film 6 includes a protrusion 61 that protrudes toward the pressure roller 7 side on the downstream side in the conveyance direction of the recording material S so that the recording material S, after passing through the fixing nip portion, is easily separated from the fixing film 6.

The after-fixing guide 101 forms an inclined plane C that is inclined by about 30 degrees with respect to the fixing discharge line Lp, and guides the leading end of the recording material S, which has been discharged from the fixing nip portion at an inclination of the fixing discharge line Lp, with the inclined plane C to convey the recording material S to the after-fixing upper guide 102. As illustrated in FIG. 3, a rib 105 is arranged in the entire area of the inclined plane C in a longitudinal direction, which is a width direction of the recording material S orthogonal to the conveyance direction of the recording material S, to prevent the recording material S from adhering to the after-fixing guide 101.

The leading end Q of the after-fixing guide 101 is positioned more on the lower side than the double-sided conveyance guide 16 with a sufficient interval from the reverse lower guide roller 19. This is to prevent the leading end Q of the after-fixing guide 101 from interfering with the trajectory of the leading end of the recording material S (the trailing end of the first side) in a case where the recording material S is switched back and conveyed. A too narrow interval from the position of the reverse lower guide roller 19 does not allow the recording material S to pass therethrough, resulting in a failure in conveyance. In contrast, a too wide interval from the position of the reverse lower guide roller 19 causes the leading end of the recording material S (the trailing end of the first side) to return to the fixing portion 56 side in a case where the recording material S is switched back and conveyed at the time of double-sided printing, resulting in a failure in double-sided conveyance. Hence, the position of the leading end Q of the after-fixing guide 101 is such a position as that satisfies a relationship of being not too wide nor too narrow as described above.

A roller 103 as a first rotating member that is driven to rotate by passage of the recording material S is arranged at the position of the leading end Q of the after-fixing guide 101 in the present exemplary embodiment. The roller 103 has a cylindrical shape with a diameter of 4 mmφ and a width of 5 mm in the longitudinal direction, and two rollers 103 are arranged in the longitudinal direction. A roller 104 as a second rotating member is arranged at a position more on the upstream side than the rollers 103 in the conveyance direction of the recording material S. The roller 104 has, similarly to the roller 103, a cylindrical shape with a diameter of 4 mmφ and a width of 5 mm in the longitudinal direction.

A material of the rollers 103 and 104 is required to have heat resistance because the rollers 103 and the roller 104 come in direct contact with the high-temperature recording material S discharged from the fixing nip portion. A material having a heat-resistant temperature of 180° C. or higher is preferable. The first side of the recording material S comes into contact with the rollers 103 and the roller 104 at the time of double-sided printing. At this time, the image formed on the surface of the recording material S is immediately after fixed by the fixing portion 56, and thus is in a semi-molten state. To prevent the rollers 103 and the roller 104 that come into contact with the image in such as a state from scratching the image, releasability from molten toner is required. In the present exemplary embodiment, polytetrafluoroethylene (PTFE), which is a fluororesin, is used as a material of the rollers 103 and 104. The material is only required to be a resin having both necessary heat resistance and releasability, such as perfluoroalkoxy alkane (PFA), fluorinated ethylene propylene (FEP), or heat-resistant grade polyoxymethylene (POM), and may be another resin.

The roller 104 is supported by a support member 106. The roller 104 is configured to be capable of performing swinging motion about a pivot axis on a circular arc. In addition, the support member 106 is configured to be capable of performing swinging motion to the downstream side in the conveyance direction of the recording material S. That is, the roller 104 supported by the support member 106 is also configured to be capable of performing swinging motion including its rotational shaft. The support member 106 is urged by a spring 107. The roller 104 in a state of being urged by the spring 107 is arranged at a position K0 on the upstream side in the conveyance direction of the recording material S with respect to the rollers 103 arranged at the leading end of the after-fixing guide 101. When the recording material S is conveyed to the roller 104, the passage of the recording material S enables swinging motion of the roller 104 to positions K1 to K3, which are indicated by broken lines in FIG. 2, while resisting urging force of the spring 107. As illustrated in FIG. 2, the positions K1 to K3 are more on the downstream side than the rollers 103 in the paper conveyance direction of the recording material S. That is, the roller 104 capable of performing swinging motion is, in a state of being in contact with the conveyed recording material S, positioned more on the downstream side than the rollers 103 in the conveyance direction of the recording material S. In addition, the support member 106 as a support unit is provided with a stopper 108, and a range in which the roller 104 can perform swinging motion is restricted from the positions K0 to K3 by the stopper 108 butting against a wall inside the image forming apparatus 50.

The roller 104 plays a role of supporting the surface of the recording material S from a non-printed surface side together with the roller 103, the rotational shaft of which is fixed to the leading end of the after-fixing guide 101, and stabilizing conveyance of the recording material S. Since the conveyance of the recording material S is stabilized by a plane formed by the roller 104 and the rollers 103 supporting the recording material S, arranging the rollers 103 and the roller 104 at such positions in the longitudinal direction as that do not overlap with each other is preferable in terms of capability of formation of the plane supporting the recording material S with fewer rollers.

In the present exemplary embodiment, as illustrated in FIG. 3, a width of the after-fixing guide 101 in the longitudinal direction is 232 mm so that a letter (LTR) size width of 216 mm, which is a maximum width that permits image formation by the image forming apparatus 50, can be supported. The two rollers 103 are arranged at the respective ends that are about 65 mm away from a central portion of the after-fixing guide 101 in the longitudinal direction, and one roller 104 is arranged at the central portion between the two rollers 103 in the longitudinal direction. With this configuration, the three rollers of the two rollers 103 and the one roller 104 can stably guide the recording material S with the plane.

In this manner, the after-fixing guide 101 according to the present exemplary embodiment brings the leading end of the recording material S, which corresponds to a non-image forming area, into contact with the rib 105 on the inclined plane C, and changes the trajectory of the leading end of the recording material S toward the after-fixing upper guide 102. Meanwhile, the after-fixing guide 101 brings the first side of the recording material S, which corresponds to an image forming area, into contact with the rollers 103, the rotational shafts of which are fixed to the leading end Q, and the roller 104 capable of performing swinging motion together with the support member 106. This configuration prevents contact between the first side of the recording material S, which corresponds to the image forming area, and the rib 105 of the after-fixing guide 101, and can thereby prevent a scratch on the image formed on the first side of the recording material S. The non-image forming area mentioned herein indicates an area of 5 mm or less from the leading end of the recording material S, and preferably an area of 2 mm or less. The first side of the recording material S, which corresponds to the image forming area, indicates an area other than the non-image forming area.

The after-fixing guide 101 is also referred to as a first guide portion that changes a first conveyance direction in which the recording material S is conveyed from the fixing portion 56 to a second conveyance direction toward the rollers 103. Furthermore, the after-fixing upper guide 102 is also referred to as a second guide portion that changes a third conveyance direction in which the recording material S is conveyed while being guided by the rollers 103 and the roller 104 to a fourth conveyance direction toward the paper discharge portion 55.

[Conveyance State of Recording Material S]

Figure 4A:
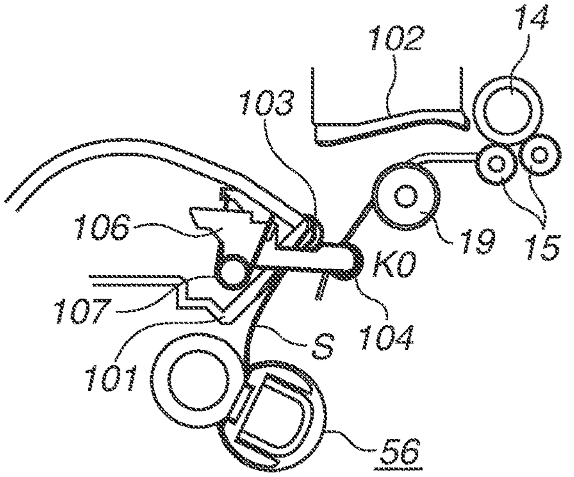
FIGS. 4A to 4D are diagrams each illustrating a conveyance state of a recording material and operations of rollers.

Subsequently, conveyance states of the recording material S and operations of the rollers 103 and the roller 104 are described with reference to FIGS. 4A to 4D. FIG. 4A illustrates a state immediately before the recording material S comes into contact with the support member 106 supporting the roller 104 after the leading end of the recording material S passes through the fixing nip portion, then the recording material S comes into contact with the after-fixing guide 101, and thereafter the recording materials S is conveyed along the inclination of the after-fixing guide 101. The roller 104 before the recording material S passes therethrough is urged at the position K0 on the upstream side in the conveyance direction of the recording material S with respect to the rollers 103 arranged at the leading end of the after-fixing guide 101.

Figure 4B:
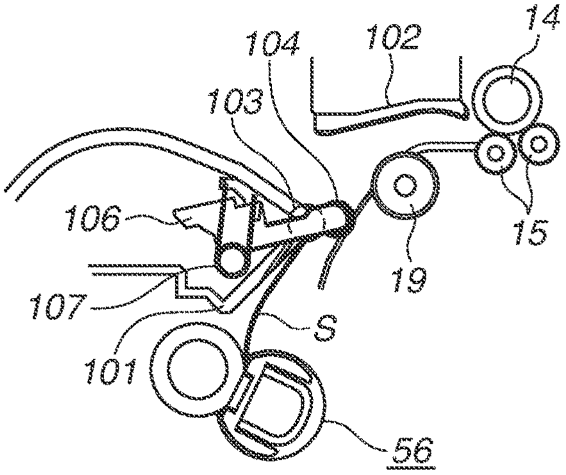

FIG. 4B illustrates a state where the recording material S is further conveyed from the state illustrated in FIG. 4A, and the leading end of the recording material S presses the support member 106 upward. When the leading end of the recording material S comes into contact with the support member 106, conveyance force of the recording material S starts swinging motion of the support member 106, and lifts the support member 106 to an upper side of the image forming apparatus 50. The conveyance of the recording material S gradually lifts the support member 106 upward, and the recording material S comes into contact with the rollers 103 that are arranged at the leading end of the after-fixing guide 101 and that are indicated by a dotted line illustrated in FIG. 4B.

Figure 4C:
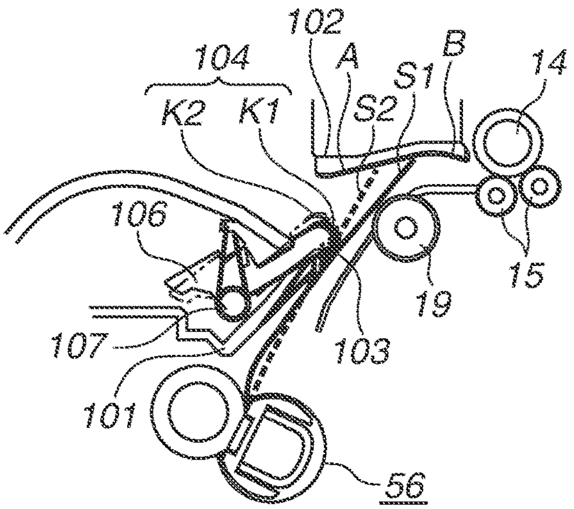

FIG. 4C illustrates a state immediately before the recording material S comes into contact with the after-fixing upper guide 102 after being further conveyed from the state illustrated in FIG. 4B. After the leading end of the recording material S starts to pass along the rollers 103, the rollers 103 come into contact with the surface of the recording material S. When the recording material S is further conveyed from this state, the roller 104 also comes into contact with the surface of the recording material S. The roller 104 has a configuration in which the support member 106 for the roller 104 is urged by the spring 107. Thus, with the stiffness of the recording material S, the roller 104 moves between the position K1 and the position K2 indicated by dotted lines in FIG. 4C and supports the recording material S. For example, when a first recording material S having a first thickness is conveyed, the position of the roller 104 becomes the position K2 due to a balance between the urging force of the roller 104 and the stiffness of the recording material S. The first recording material S is conveyed in a trajectory S2 indicated by a dotted line illustrated in FIG. 4C. It can also be said that the roller 104 performs swinging motion by a first amount of movement from the position K0 to the position K2 as a first position.

For example, in a case where a second recording material S having a second thickness that is less than the first thickness is conveyed, on the other hand, the position of the roller 104 becomes the position K1 closer to the reverse lower guide roller 19 than the position K2 due to the balance between the urging force of the roller 104 and the stiffness of the recording material S. The second recording material S is conveyed in a trajectory S1 indicated by a solid line illustrated in FIG. 4C. It can also be said that the roller 104 performs swinging motion by a second amount of movement that is smaller than the first amount of movement to move from the position K0 to the position K1 as a second position.

For example, in a case where the recording material S with low stiffness such as thin paper is conveyed in the trajectory S2 and comes into contact with the after-fixing upper guide 102 at a large entry angle, there is a possibility that the leading end of the recording material S folds down, resulting in a conveyance malfunction (hereinafter also referred to as a jam). As in the case for the present exemplary embodiment, the urging force of the roller 104 capable of performing swinging motion allows the trajectory of the recording material S, in the case of thin paper, to have an entry angle like the entry angle of the trajectory S1 smaller than the entry angle of the trajectory S2. This configuration enables selection of a conveyance trajectory of the recording material S in accordance with a type of the recording material S, and thereby enables prevention of occurrence of a jam in the after-fixing upper guide 102. Both in a case where the roller 104 is at the position K1 and in a case where the roller 104 is at the position K2, the surface of the recording material S is supported only by the rollers 103 and the roller 104, and does not come into contact with the rib 105 of the after-fixing guide 101.

The after-fixing upper guide 102 is now described. The after-fixing upper guide 102 includes two inclined planes A and B and has a shape of protruding upward as illustrated in FIG. 4C. The inclined plane A of the after-fixing upper guide 102 is inclined with respect to the fixing discharge line Lp at an angle larger than the inclination of the after-fixing guide 101 with respect to the fixing discharge line Lp. The inclined plane A, together with the after-fixing guide 101, changes an orientation of the recording material S that has passed through the fixing nip portion of the fixing portion 56, and guides the leading end of the recording material S in a direction of the paper discharge portion 55.

In the present exemplary embodiment, the inclined plane A of the after-fixing upper guide 102 is configured to be inclined by about 60 degrees with respect to the fixing discharge line Lp. In a case where the recording material S is switched back and conveyed at the time of double-sided printing, the inclined plane A of the after-fixing upper guide 102 is also capable of guiding the leading end of the recording material S (the trailing end of the first side) that has been lifted upward by the two paper discharge rollers 15 or the reverse lower guide roller 19 toward the double-sided conveyance guide 16.

The inclined plane B of the after-fixing upper guide 102 guides the leading end of the recording material S to be smoothly conveyed to a paper discharge nip portion formed by the paper discharge roller 14 and the paper discharge rollers 15. Hence, the inclined plane B is formed as an inclined plane from the paper discharge roller 14 toward the paper discharge rollers 15, and is configured to have an inclination opposite to that of the inclined plane A. In this manner, the after-fixing upper guide 102 has the inclined planes A and B that play different roles, and has a shape of connecting the inclined planes A and B in a gentle curve. The after-fixing upper guide 102 is configured to have a rib for a similar reason to the configuration of the after-fixing guide 101. The after-fixing upper guide 102 comes into contact with the leading end of the recording material S that is not the image forming area, and guides the leading end of the recording material S so as to change the conveyance direction of the leading end of the recording material S.

Figure 4D:
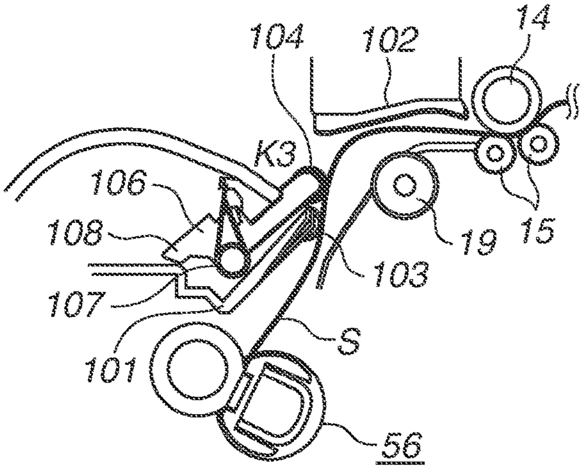

FIG. 4D illustrates a state after the recording material S is further conveyed from the state illustrated in FIG. 4C, and the leading end of the recording material S is guided by the inclined plane B of the after-fixing upper guide 102 to the paper discharge nip portion. A conveying speed of the recording material S at the paper discharge roller 14 of the paper discharge portion 55 is set to be lower than a conveying speed of the recording material S at the fixing portion 56. This is because, since the reverse lower guide roller 19 is arranged, there is a possibility that the recording material S is strongly rubbed by the reverse lower guide roller 19 when the conveying speed of the recording material S at the paper discharge portion 55 is higher than that at the fixing portion 56. The reverse lower guide roller 19 is configured so that it can be driven to rotate even when the recording material S comes into contact therewith.

However, when the recording material S comes into contact with the reverse lower guide roller 19 strongly in a state where the recording material S is pulled by the fixing portion 56 and the paper discharge portion 55 under tension, there is a possibility that the image on the recording material S is scratched. Thus, the conveying speed of the recording material S at the paper discharge portion 55 is set to be lower than that at the fixing portion 56, and the image forming apparatus 50 performs control to form slack of the recording material S between the fixing portion 56 and the paper discharge portion 55. Therefore, as illustrated in FIG. 4D, the recording material S after the leading end of the recording material S enters the paper discharge roller 14 and the paper discharge rollers 15 is in a state of having slack between the fixing portion 56 and the paper discharge portion 55.

Figure 11:
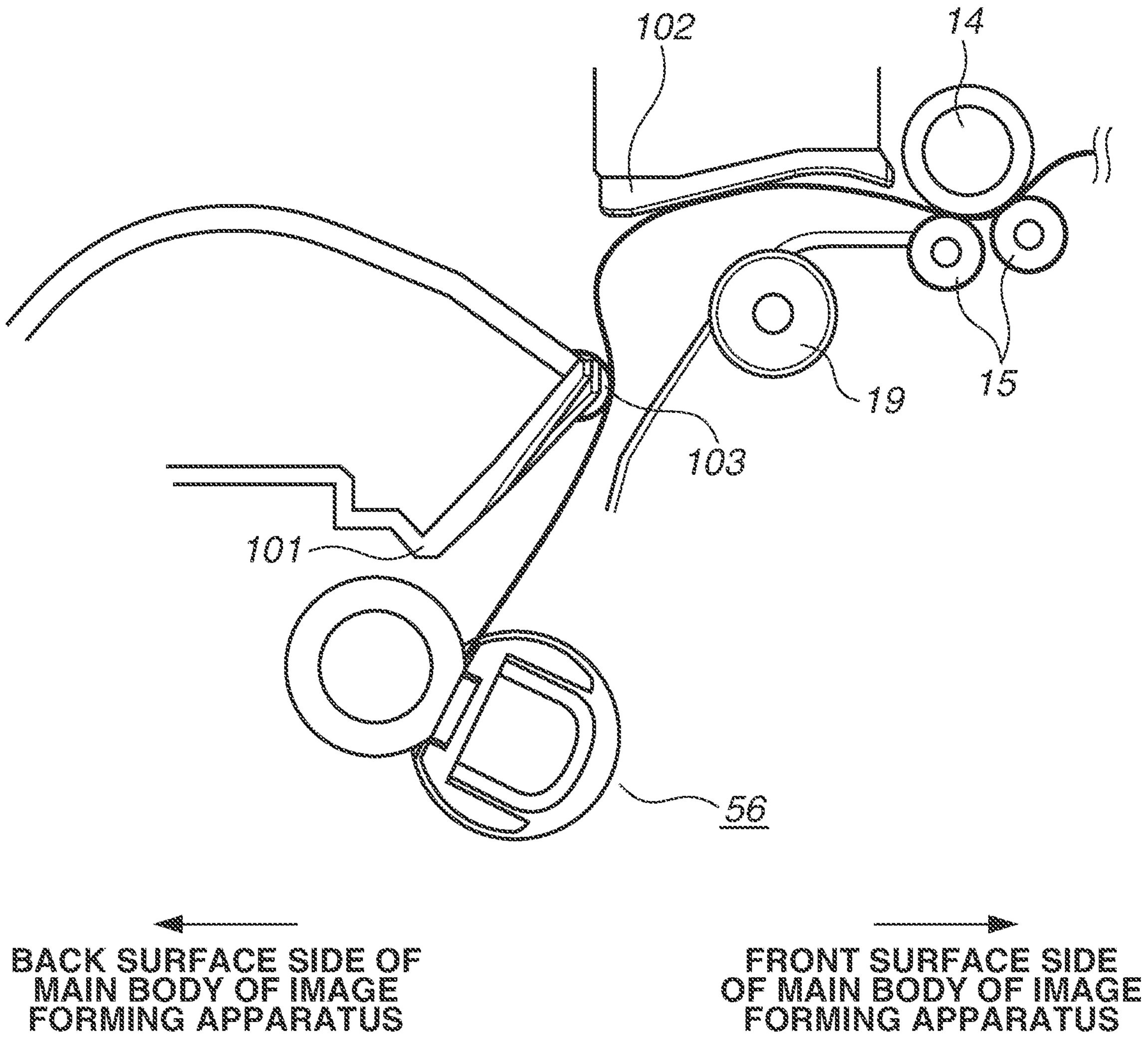
FIG. 11 is a diagram illustrating a guide configuration according to a comparative example.

The higher the stiffness of the recording material S is (for example, thick paper), the larger the restorative force to return to its original flat state is. Thus, the recording material S becomes to have a gentler curvature and draw a trajectory having a large radius of curvature. As a comparative example, FIG. 11 illustrates a configuration in a case where only the fixed rollers 103 are arranged, and a state where the recording material S has slack between the paper discharge portion 55 and the fixing portion 56. Since the comparative example illustrated in FIG. 11 has only one stage of the rollers 103, there is a case where the slack of the recording material S grows so as to wrap around the rollers 103, and the slack becomes too large. If the slack of the recording material S becomes too large in this manner, there is a case where the first side of the recording material S comes into contact with the after-fixing upper guide 102, and there is a possibility that the image on the first side is scratched.

To address this, the present exemplary embodiment is provided with the roller 104 capable of performing swinging motion other than the rollers 103 fixed to the after-fixing guide 101. A movable range of the roller 104 is restricted by the stopper 108 of the support member 106 to the position K3 illustrated in FIG. 4D. At the position K3, the roller 104 is configured to support the surface of the recording material S together with the rollers 103. That is, the surface of the recording material S is in a state of being supported by a triangle plane formed by the two rollers 103 in a first stage and the one roller 104 in a second stage. This configuration prevents the slack of the recording material S from growing too large, and can thereby prevent the surface of the recording material S from rubbing against the after-fixing upper guide 102.

The roller 104, which is capable of performing swinging motion and is supported by the support member 106 capable of performing swinging motion, is also referred to as a movable roller. The rollers 103 arranged at the leading end Q of the after-fixing guide 101 are also referred to as fixed rollers. The position and number of the rollers 103 and those of the roller 104 in the longitudinal direction can be selected as appropriate in accordance with the size of the whole of the image forming apparatus 50, an angle of the fixing nip tangent line LNip, an angle of the fixing discharge line Lp, a height and angle of the rib 105 of the after-fixing guide 101, a basis weight of the recording material S, or the like.

[Effects]

Subsequently, a description will be given of effects according to the present exemplary embodiment with reference to Table 1, FIGS. 4A to 4D, FIG. 10, and FIG. 11.

Table 1 is a list of phenomena and effects according to the configuration of the present exemplary embodiment, the conventional example, and the comparative example.

In Table 1, an "image scratch on thick paper" indicates whether an image scratch occurs by the surface of the recording material S rubbing against the after-fixing upper guide 102 due to the slack of the recording material S formed by the fixing portion 56 and the paper discharge portion 55. In particular, the image scratch is likely to occur on thick paper having high stiffness, and a case where the image scratch occurs is indicated as "OCCUR", while a case where no image scratch occurs is indicated as "NOT OCCUR". In Table 1, a "thin paper jam" indicates a conveyance malfunction caused by the recording material S coming into contact with the after-fixing upper guide 102. A case where the conveyance malfunction of the recording material S occurs is indicated as "OCCUR", while a case where no conveyance malfunction of the recording material S occurs is indicated as "NOT OCCUR". In Table 1, an "image scratch by the after-fixing guide 101" indicates whether an image scratch by the surface of the recording material S rubbing against the after-fixing guide 101 occurs. A case where the image scratch occurs is indicated as "OCCUR", while a case where no image scratch occurs is indicated as "NOT OCCUR".

TABLE 1

| | FIRST EXEMPLARY EMBODIMENT | CONVENTIONAL EXAMPLE | FIRST COMPARATIVE EXAMPLE | SECOND COMPARATIVE EXAMPLE |
|---|---|---|---|---|
| FIXED ROLLERS 103 IN FIRST STAGE | PRESENT | ABSENT | PRESENT | PRESENT |
| MOVABLE ROLLER 104 IN SECOND STAGE | PRESENT | ABSENT | ABSENT | FIXED AT K2 |
| IMAGE SCRATCH ON THICK PAPER | NOT OCCUR | NOT OCCUR | OCCUR | NOT OCCUR |
| THIN PAPER JAM | NOT OCCUR | NOT OCCUR | OCCUR | OCCUR |
| IMAGE SCRATCH BY AFTER-FIXING GUIDE 101 | NOT OCCUR | OCCUR | NOT OCCUR | NOT OCCUR |

The configuration of the present exemplary embodiment is a two-stage configuration composed of the fixed rollers 103 in the first stage and the roller 104 in the second stage capable of performing swinging motion, as illustrated in FIG. 4D. The configuration can support the surface of the recording material S with the plane formed by these rollers, and can thereby prevent the slack between the fixing portion 56 and the paper discharge portion 55 from becoming too large and prevent the recording material S from rubbing against the after-fixing upper guide 102. Hence, the configuration can also prevent occurrence of the image scratch on thick paper having high stiffness. In addition, since the configuration has the roller 104 capable of performing swinging motion in the second stage, thin paper having low stiffness is conveyed in the trajectory of S1 as illustrated in FIG. 4C. Thus, the configuration can prevent the entry angle of the thin paper to enter the after-fixing upper guide 102 from becoming too large and prevent occurrence of a jam. Additionally, since only the rollers 103 and the roller 104 are configured to come into contact with the image forming area of the recording material S, the configuration can also prevent occurrence of the image scratch by the rib 105 of the after-fixing guide 101.

Figure 10:
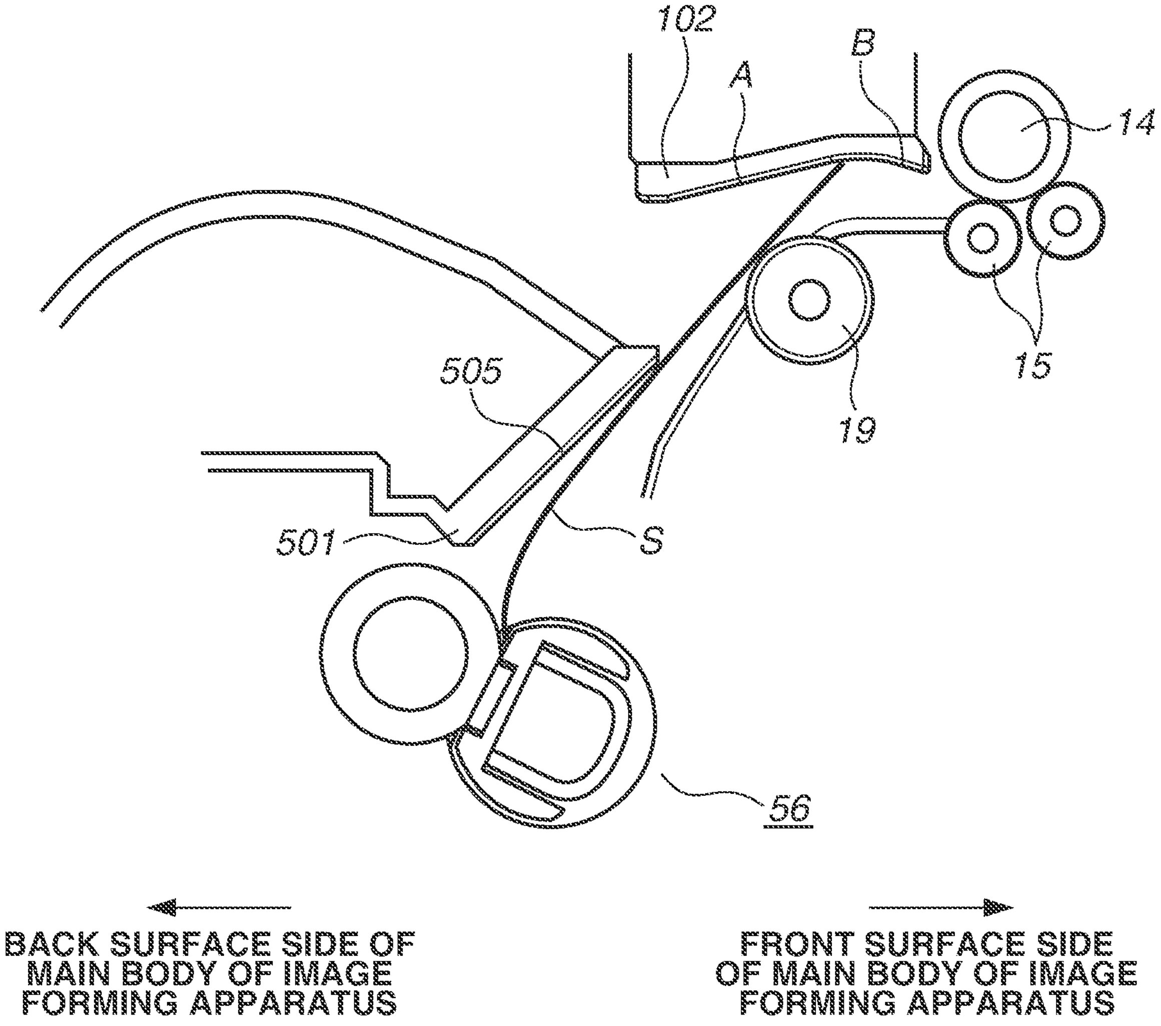
FIG. 10 is a diagram illustrating a guide configuration according to a conventional example.

Subsequently, the conventional example is described. FIG. 10 illustrates a guide configuration according to the conventional example. The conventional example has a configuration in which no roller is arranged in an after-fixing guide 501. The recording material S discharged from the fixing portion 56 is guided by the after-fixing guide 501 so that the conveying direction is changed. At this time, since the image of the recording material S rubs against a rib 505 of the after-fixing guide 501, the image scratch occurs. However, like the conventional example, the configuration of supporting the surface of the recording material S with the rib 505 of the after-fixing guide 501 can prevent, even in the case of thick paper, the slack between the fixing portion 56 and the paper discharge portion 55 from becoming too large. Hence, the configuration can prevent the occurrence of the image scratch by the surface of the recording material S rubbing against the after-fixing upper guide 102. Even in the case of thin paper, since a plurality of ribs 505 arranged in the after-fixing guide 501 directly guides the surface of the recording material S, the configuration can prevent the leading end of the recording material S from coming into contact with the inclined plane A side of the after-fixing upper guide 102 in an extreme manner. That is, the configuration can prevent a jam of the thin paper.

Subsequently, a first comparative example is described. FIG. 11 illustrates a guide configuration of the first comparative example. The first comparative example has a configuration in which only the fixed roller 103 is arranged. As described above, in a case where the slack is formed by the fixing portion 56 and the paper discharge portion 55 and only one stage of the roller 103 is arranged, there is a case where the slack of the recording material S becomes too large, and the recording material S comes into contact with the after-fixing upper guide 102, resulting in a scratch on an image.

Figure 12:
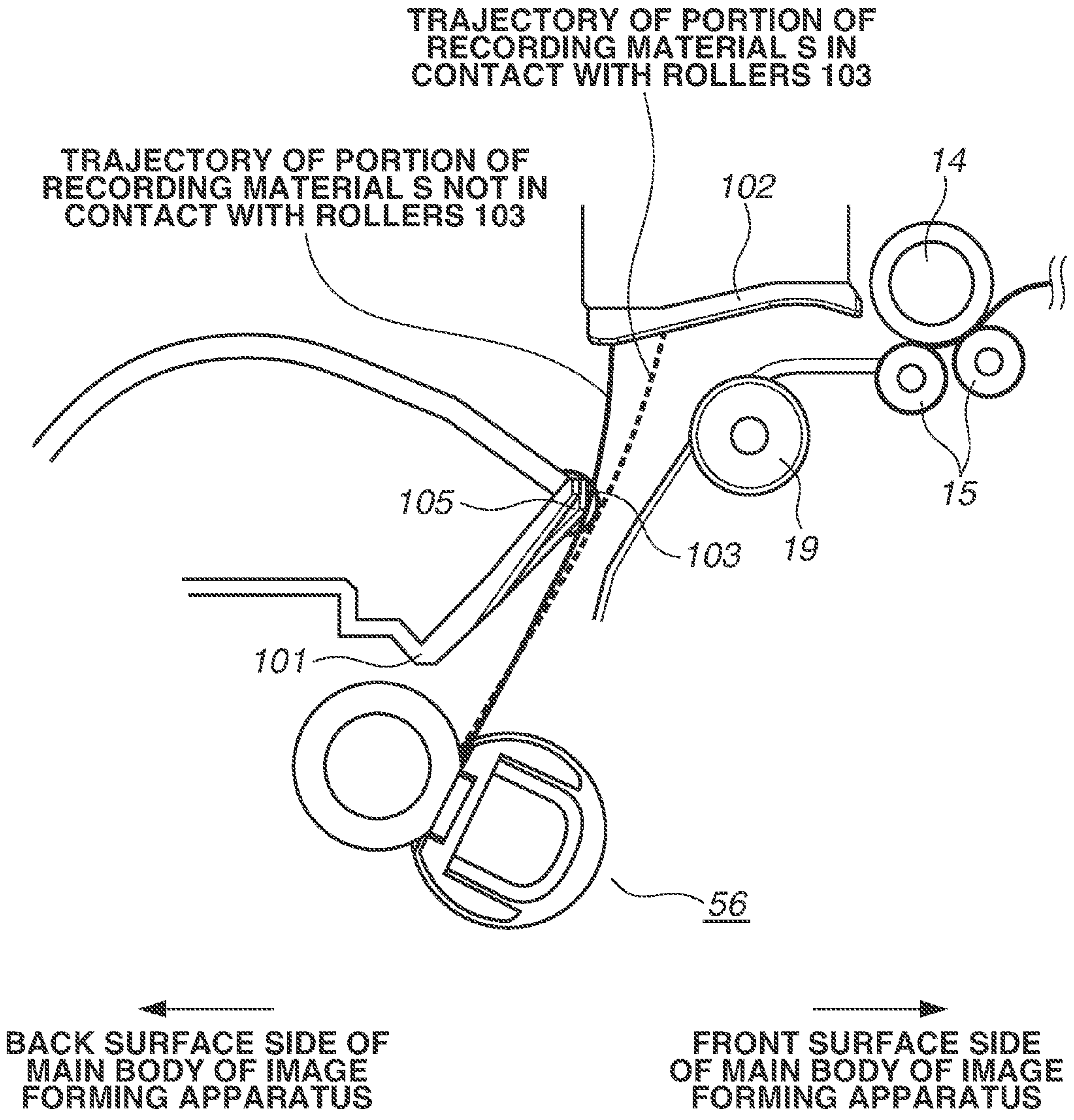
FIG. 12 is a diagram illustrating a guide configuration according to a comparative example.

Since the first comparative example is not configured to guide the recording material S to the inclined plane B side of the after-fixing upper guide 102, in a case where thin paper having low stiffness is conveyed, the recording material S comes into contact with the inclined plane A side of the after-fixing upper guide 102. FIG. 12 illustrates a configuration in which the rollers 103 are arranged at the leading end of the after-fixing guide 101, similarly to the configuration of FIG. 11, and a case where thin paper is conveyed. Two rollers 103 are arranged at a substantially central portion in the longitudinal direction. An inclined plane of the after-fixing guide 101 is composed of the rib 105, and the leading end of the recording material S is guided by the rib 105 of the after-fixing guide 101 toward the after-fixing upper guide 102. However, the rib 105 is arranged at a position away from the trajectory of the recording material S with respect to the rollers 103 so that the recording material S does not come into contact with the rib 105 after the leading end of the recording material S starts to pass along the rollers 103 and the surface of the recording material S comes into contact with the rollers 103. Such a configuration allows a portion of the recording material S supported by the roller 103 to be smoothly guided to the after-fixing upper guide 102. Meanwhile, since the end portion of the recording material S in the longitudinal direction is not supported by the rollers 103, there is a case where the recording material S is conveyed toward the image forming apparatus's back surface side of the after-fixing upper guide 102. Hence, the entry angle of the end portion of the recording material S in the longitudinal direction into the after-fixing upper guide 102 becomes large, and the leading end of the recording material S folds down, resulting in a jam.

Subsequently, a second comparative example is described. The second comparative example has a configuration in which there are two stages of rollers, but the centers of the rotational shafts of the rollers in both the stages are fixed. For example, the present exemplary embodiment has a configuration in which the roller 104 capable of performing swinging motion is fixed to the position K2 illustrated in FIG. 4C. With such a configuration, even in a case where the recording material S that is hard to be stably conveyed and that has low stiffness, such as thin paper left in a high-temperature and humidity environment is conveyed, the recording material S comes into contact with the inclined plane A side of the after-fixing upper guide 102 in the trajectory S2. In the case of paper having low stiffness such as thin paper, the leading end of the paper folds down, resulting in a jam, similarly to the case described with reference to the first comparative example.

In this manner, arranging the rollers 103 at the fixed positions and the roller 104 capable of performing swinging motion between the fixing portion 56 and the paper discharge portion 55 enables conveyance of the recording material S to the paper discharge portion 55 while preventing occurrence of a conveyance malfunction and degradation of image quality. Like the image forming apparatus 50 illustrated in FIG. 1, the configuration of changing the conveyance direction of the recording material S after passing through the fixing portion 56 to convey the recording material S to the paper discharge portion 55 can reduce the height of the main body of the image forming apparatus 50. Also in a case of such a configuration of guiding the conveyance direction of the recording material S, arranging the rollers 103 at the fixed position and the roller 104 capable of performing swinging motion between the fixing portion 56 and the paper discharge portion 55 enables conveyance of the recording material S to the paper discharge portion 55 while preventing occurrence of a conveyance malfunction and degradation of image quality.

In a second exemplary embodiment, a description will be given of a configuration in which the roller 104 and the support member 106 that supports the roller 104 also serve as a sensor that detects the recording material S. A detailed description of a configuration that is similar to that of the first exemplary embodiment, such as the configuration of the image forming apparatus 50, is omitted in the present exemplary embodiment.

[Configuration of Paper Discharge Guide Portion]

Figure 5A:
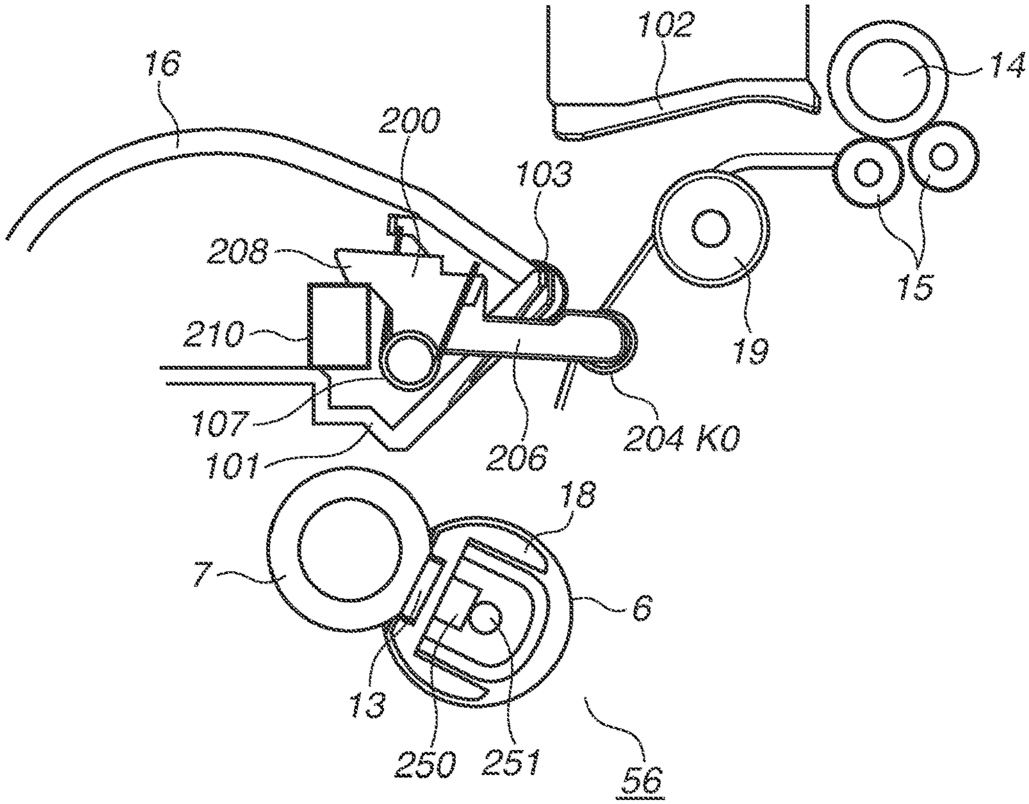
FIGS. 5A and 5B are schematic configuration diagrams illustrating the fixing portion, the paper discharge guide portion, and the paper discharge portion in an enlarged manner.
Figure 5B:
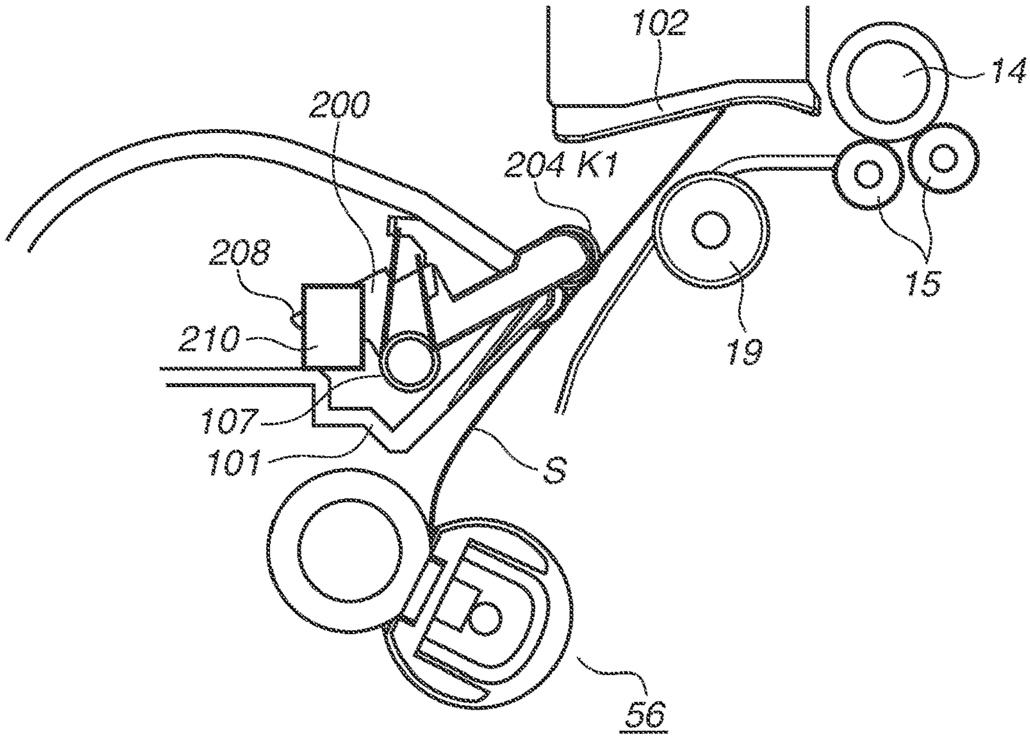

FIGS. 5A and 5B are schematic configuration diagrams illustrating the fixing portion 56, the paper discharge guide portion 51, and the paper discharge portion 55 according to the second exemplary embodiment in an enlarged manner. The same constituent element as FIG. 2 described above is denoted by the same reference sign.

A paper discharge sensor 200 is arranged more on the downstream side than the fixing portion 56, and capable of detecting whether a winding jam, in which the recording material S is wound around the fixing film 6, occurs. In addition, the paper discharge sensor 200 is also capable of detecting whether the recording material S has passed along the paper discharge sensor 200, and also capable of performing control to reverse the recording material S to the double-sided conveyance path. The paper discharge sensor 200 is urged by the spring 107, and includes a flag 206 capable of performing swinging motion by the passage of the recording material S, and a photo sensor 210 capable of detecting ON/OFF by a light shielding member 208, which is part of the flag 206, blocking light. The paper discharge sensor 200 also includes a roller 204 that is capable of performing swinging motion by the passage of the recording material S and that is driven to rotate by the conveyance of the recording material S. The roller 104 in FIG. 2 described above corresponds to the roller 204 according to the present exemplary embodiment. The support member 106 corresponds to the flag 206 according to the present exemplary embodiment. With the addition of the photo sensor 210, the present exemplary embodiment has the configuration in which the roller 104 and the support member 106 that supports the roller 104 also serve as a sensor that detects the recording material S.

As illustrated in FIG. 5A, in a case where the recording material S is not conveyed to a detection area of the paper discharge sensor 200, the roller 204 arranged at the leading end of the paper discharge sensor 200 is arranged at the position K0. The position K0 is a position on the upstream side in the conveyance direction of the recording material S with respect to the roller 103 arranged at the leading end of the after-fixing guide 101. The roller 204 is configured to, when the recording material S is conveyed to the detection area of the paper discharge sensor 200, be capable of performing swinging motion to the position K1 illustrated in FIG. 5B while resisting urging force of the spring 107 by the passage of the recording material S.

Figure 6:
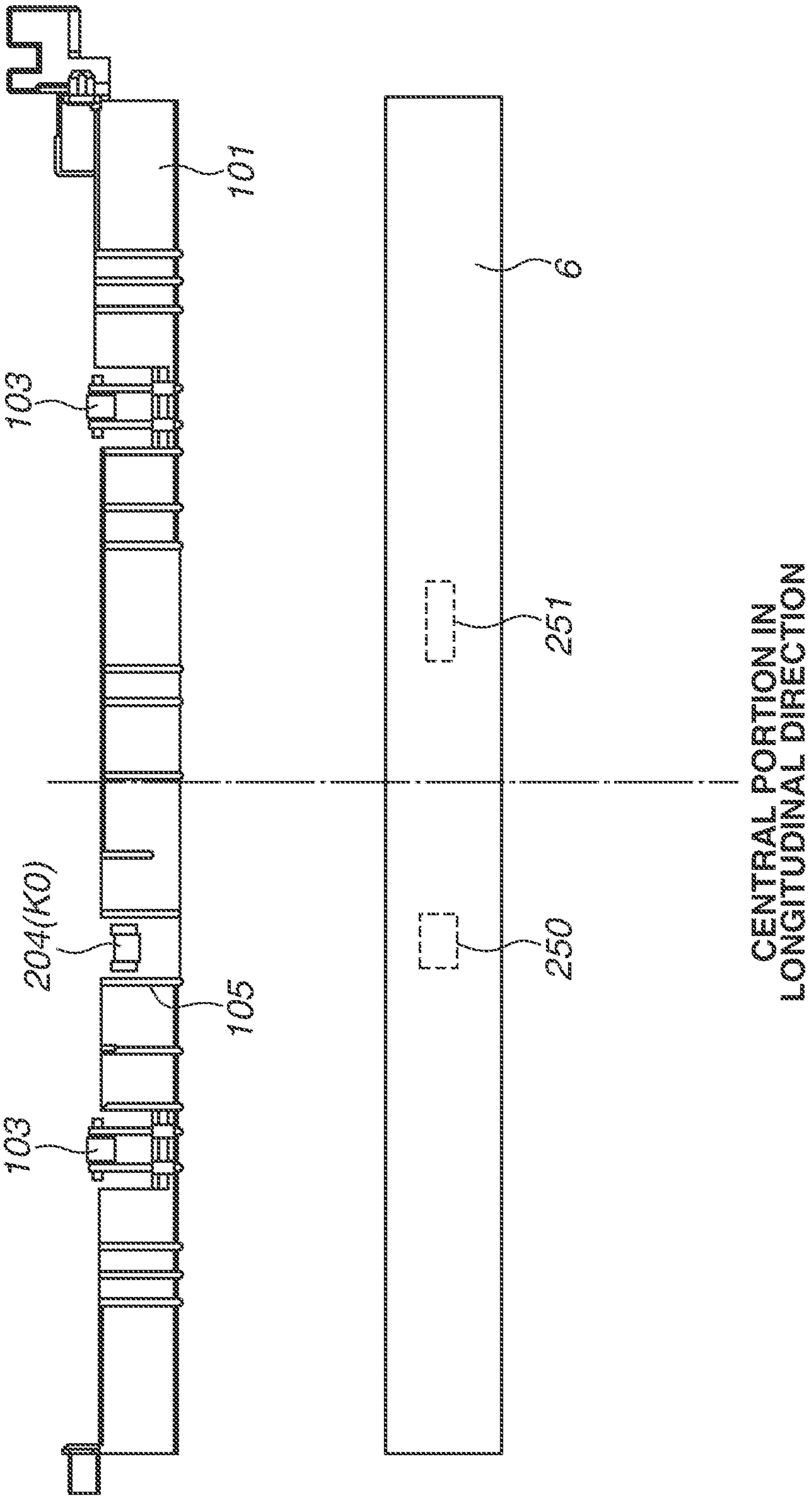
FIG. 6 is a schematic diagram illustrating a paper discharge sensor and the after-fixing guide when viewed from the front surface side of the main body of the image forming apparatus.

FIG. 6 illustrates a configuration illustrating the paper discharge sensor 200 and the after-fixing guide 101 when viewed from the front side of the image forming apparatus 50. The paper discharge sensor 200 is arranged at a position, in the longitudinal direction, that is identical to a position of a temperature detection element 250 such as a thermistor arranged on the back surface of the heater 13. The temperature detection element 250 detects a temperature of a ceramic substrate that has increased in accordance with heat generation of an electric heating resistor layer. Controlling currents flowing from an electrode portion, which is at the end portion in the longitudinal direction and is not illustrated, into the electric heating resistor layer in response to the detection of the temperature by the temperature detection element 250 adjusts the temperature of the heater 13.

A safety element 251 is also arranged on the back surface of the heater 13. In a case of a malfunction of the temperature detection element 250 or the like, there is a possibility that excessive energization abnormally increases the temperature of the heater 13. The safety element 251 stops energization at the time of abnormal temperature rise to prevent cracking of the heater 13 due to the abnormal temperature rise, and prevent ignition. The safety element 251 according to the present exemplary embodiment is a typical thermal switch, and is connected in series to a conductive wire that is electrically connected to the heater 13. The safety element 251 has a structure in which, when a temperature of the safety element 251 (a back surface temperature of the heater 13) reaches 270° C., deformation of a bimetal blocks energization of the heater 13. Even in a case where a malfunction of the temperature detection element 250 occurs, the safety element 251 blocks energization to stop heating of the heater 13 when the back surface temperature of the heater 13 reaches 270° C., and can thereby prevent ignition by cracking of the heater 13.

Such a safety element 251 and the temperature detection element 250 are arranged to be bilaterally symmetric on the back surface of the heater 13. In the present exemplary embodiment, the safety element 251 and the temperature detection element 250 are arranged to be bilaterally symmetric at respective positions of 30 mm away from the central portion in the longitudinal direction. Hence, to align the position of the paper discharge sensor 200 with that of the temperature detection element 250 in the longitudinal direction, the paper discharge sensor 200 is similarly arranged so as to be in contact with the recording material S at the position of 30 mm away from the central portion in the longitudinal direction of the after-fixing guide 101.

In this manner, the description has been given of the configuration in which the roller 204 capable of performing swinging motion and the flag 206 that supports the roller 204 also play the role of the paper discharge sensor 200 in the present exemplary embodiment. Also in such a configuration, with the arrangement of a plurality of rollers 103 fixed to the after-fixing guide 101 in the longitudinal direction, the roller 204 that comes into contact with the recording material S more on the downstream side than the rollers 103 in the conveyance direction of the recording material S and that is capable of performing swinging motion can guide the recording material S. Hence, the configuration prevents occurrence of a conveyance malfunction and degradation of image quality and enables conveyance of the recording material S to the paper discharge portion 55 similarly to the first exemplary embodiment described above.

The present exemplary embodiment also has a two-stage configuration composed of the first stage of the fixed rollers 103 and the second stage of the roller 204 capable of performing swinging motion, similarly to the first exemplary embodiment described above. The configuration can support the surface of the recording material S with the plane formed by these rollers, and can thereby prevent the slack between the fixing portion 56 and the paper discharge portion 55 from becoming too large and prevent the recording material S from rubbing against the after-fixing upper guide 102.

Thus, the configuration can prevent occurrence of the image scratch on thick paper having high stiffness. In addition, since the configuration has the roller 104 capable of performing swinging motion in the second stage, thin paper having low stiffness is conveyed in the trajectory of S1 as illustrated in FIG. 4C. Hence, the configuration can prevent the entry angle of the recording material S to enter the after-fixing upper guide 102 from becoming too large and prevent occurrence of a jam. Additionally, since only the rollers 103 and the roller 104 are configured to come into contact with the image forming area of the recording material S, the configuration can prevent occurrence of the image scratch by the rib 105 of the after-fixing guide 101.

The description has been given of the configuration in which the roller can perform swinging motion in the arc about the rotational shaft in the first and second exemplary embodiments described above. In a third exemplary embodiment, a configuration in which the roller can perform swinging motion in a linear manner will be described. A detailed description of a configuration that is similar to that of the first and second exemplary embodiments described above, such as the configuration of the image forming apparatus 50 is omitted.

[Configuration of Paper Discharge Guide Portion]

Figure 7:
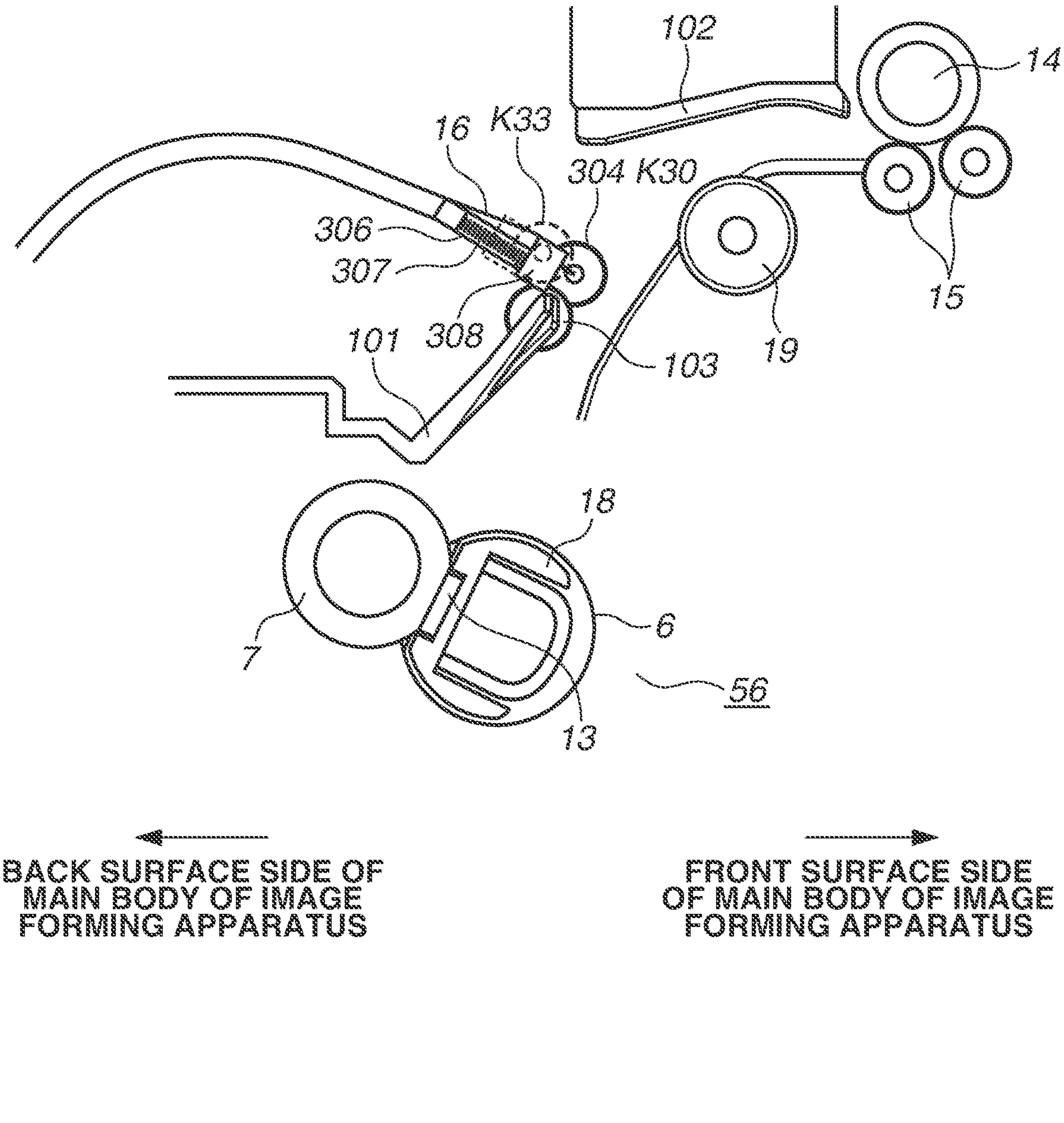
FIG. 7 is a schematic configuration diagram illustrating the fixing portion, the paper discharge guide portion, and the paper discharge portion in an enlarged manner.

FIG. 7 is a schematic configuration diagram illustrating the fixing portion 56, the paper discharge guide portion 51, and the paper discharge portion 55 according to the third exemplary embodiment in an enlarged manner. The same constituent element as FIG. 2 described above is denoted by the same reference sign.

Similarly to FIG. 2 described above, the rollers 103 that are driven to rotate by the passage of the recording material S are arranged at the leading end of the after-fixing guide 101. A roller 304 capable of performing swinging motion is urged by a spring 307 and arranged at a position K30, which is illustrated in FIG. 7, more on the downstream side than the rollers 103 in the conveyance direction of the recording material S. The roller 304 is arranged more on the upstream side than the double-sided conveyance guide 16 in the conveyance direction of the recording material S, that is, more on a lower side than the double-sided conveyance guide 16 in a height direction of the image forming apparatus 50. This is to facilitate conveyance of the recording material S, which has been switched back and conveyed by the paper discharge roller 14, to the double-sided conveyance guide 16. Arranging the roller 304 at such a position can also prevent the occurrence of the conveyance malfunction of the recording material S at the time of double-sided conveyance.

The roller 304 is held in a state of protruding from a roller holder 308, and has a configuration of preventing the surface of the recording material S from rubbing against the roller holder 308 and a slide guide 306. When the roller holder 308 is urged by the spring 307 and the roller 304 is pressed by the passage of the recording material S, the roller 304 is capable of performing swinging motion along the slide guide 306.

The roller 304 in the state of being urged by the spring 307 is arranged at a position K30 on the downstream side in the conveyance direction of the recording material S with respect to the rollers 103 arranged at the leading end of the after-fixing guide 101. When the recording material S starts to pass along the roller 304, the roller 304 is capable of performing swinging motion to a position K33 indicated by a dotted line illustrated in FIG. 7 while resisting urging force of the spring 307. At the position K30, the recording material S, when coming into contact with the roller 304, can be guided to the paper discharge portion 55 without folding a corner down by hooking of the recording material S on the roller 304 or the roller holder 308 that supports the roller 304. Additionally, to convey the recording material S, which has been switched back and conveyed, to the double-sided conveyance guide 16, the present exemplary embodiment has such a configuration as that the recording material S does not block the reverse conveyance path. To achieve both of the features, the roller 304 is arranged at the position overlapping with the leading end of the double-sided conveyance guide 16. In addition, a stopper, which is not illustrated, is arranged in the slide guide 306 that supports the roller holder 308, and the roller 304 is restricted to be at the position K33 by the roller holder 308 butting against the stopper.

Similarly to the exemplary embodiments described above, the roller 304, together with the rollers 103, supports the surface of the recording material S, and can thereby stabilize the conveyance of the recording material S. Since the conveyance of the recording material S is stabilized by a plane formed by the roller 304 and the rollers 103 supporting the recording material S, it is preferable to arrange the rollers 103 and the roller 304 so that positions thereof in the longitudinal direction do not overlap with each other in terms of capability of forming the plane supporting the recording material S with fewer rollers. In the present exemplary embodiment, the two rollers 103 are arranged at the respective ends that are about 65 mm away from the central portion of the after-fixing guide 101 in the longitudinal direction, and one roller 304 is arranged at the central portion between the two rollers 103 in the longitudinal direction. With this configuration, the three rollers of the two rollers 103 and the one roller 304 can stably guide the recording material S with the plane.

[Conveyance state of Recording Material S]

Figure 8A:
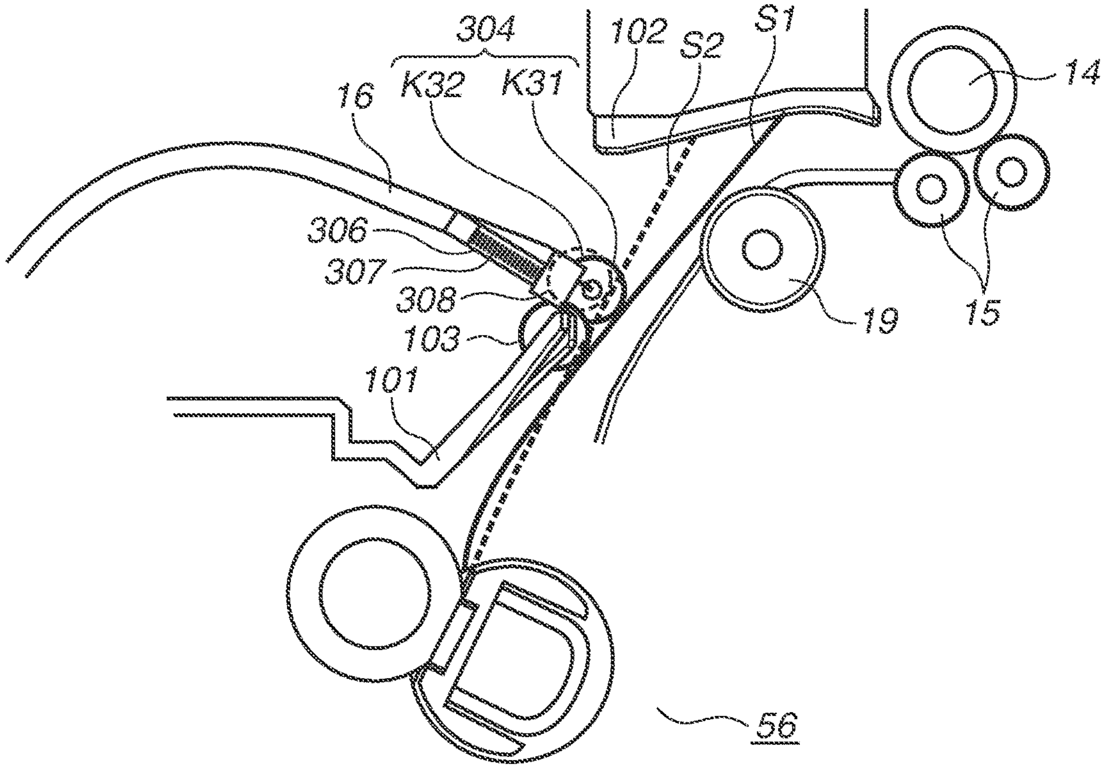
FIGS. 8A and 8B are diagrams each illustrating a conveyance state of the recording material and operations of rollers.

Subsequently, conveyance states of the recording material S and operations of the rollers 103 and the roller 304 are described with reference to FIGS. 8A and 8B. FIG. 8A illustrates a state immediately before the recording material S comes into contact with the after-fixing upper guide 102 after the leading end of the recording material S passes along the roller 304. With the configuration in which the roller 304 is being urged by the spring 307, for example, when the first recording material S having the first thickness is conveyed, the position of the roller 304 becomes a position K32 due to a balance between the urging force of the roller 304 and the stiffness of the recording material S. The first recording material S is conveyed in the trajectory S2 indicated by a dotted line illustrated in FIG. 8A. It can also be said that the roller 304 performs swinging motion by a third amount of movement from the position K30 and moves to the position K32 as a third position.

For example, in a case where the second recording material S having the second thickness that is less than the first thickness is conveyed, on the other hand, the position of the roller 304 becomes a position K31 closer to the reverse lower guide roller 19 than the position K32 due to the balance between the urging force of the roller 304 and the stiffness of the recording material S. The second recording material S is conveyed in the trajectory S1 indicated by a solid line illustrated in FIG. 8A. It can also be said that the roller 304 performs swinging motion by a fourth amount of movement that is smaller than the third amount of movement from the position K30 and moves to the position K31 as a fourth position.

For example, in a case where the recording material S with low stiffness such as thin paper is conveyed in the trajectory S2 and comes into contact with the after-fixing upper guide 102 at a large entry angle, there is a possibility that the leading end of the recording material S folds down, resulting in a jam. As in the case for the present exemplary embodiment, the urging force of the roller 304 capable of performing swinging motion allows the trajectory of the recording material S, in the case of thin paper, to have an entry angle like the entry angle of the trajectory S1 smaller than the entry angle of the trajectory S2. This configuration enables appropriate selection of a conveyance trajectory of the recording material S in accordance with a type of the recording material S, and thereby enables prevention of a jam in the after-fixing upper guide 102.

Figure 8B:
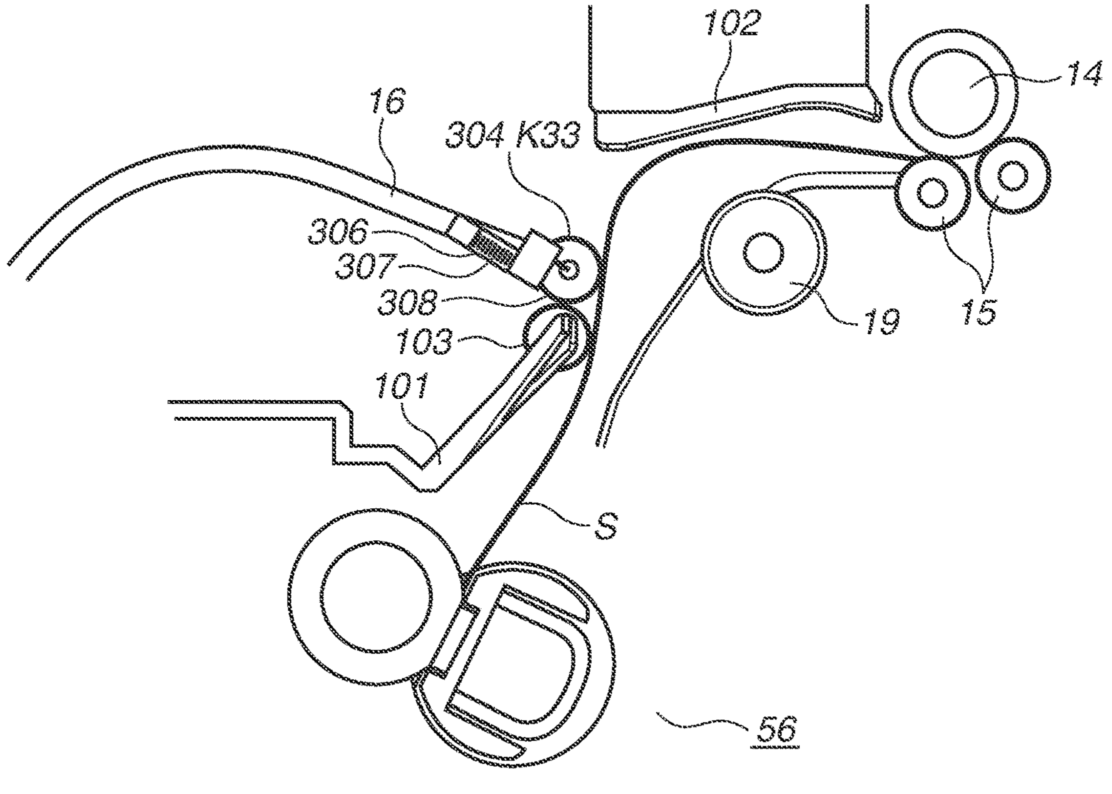
Figure 9:
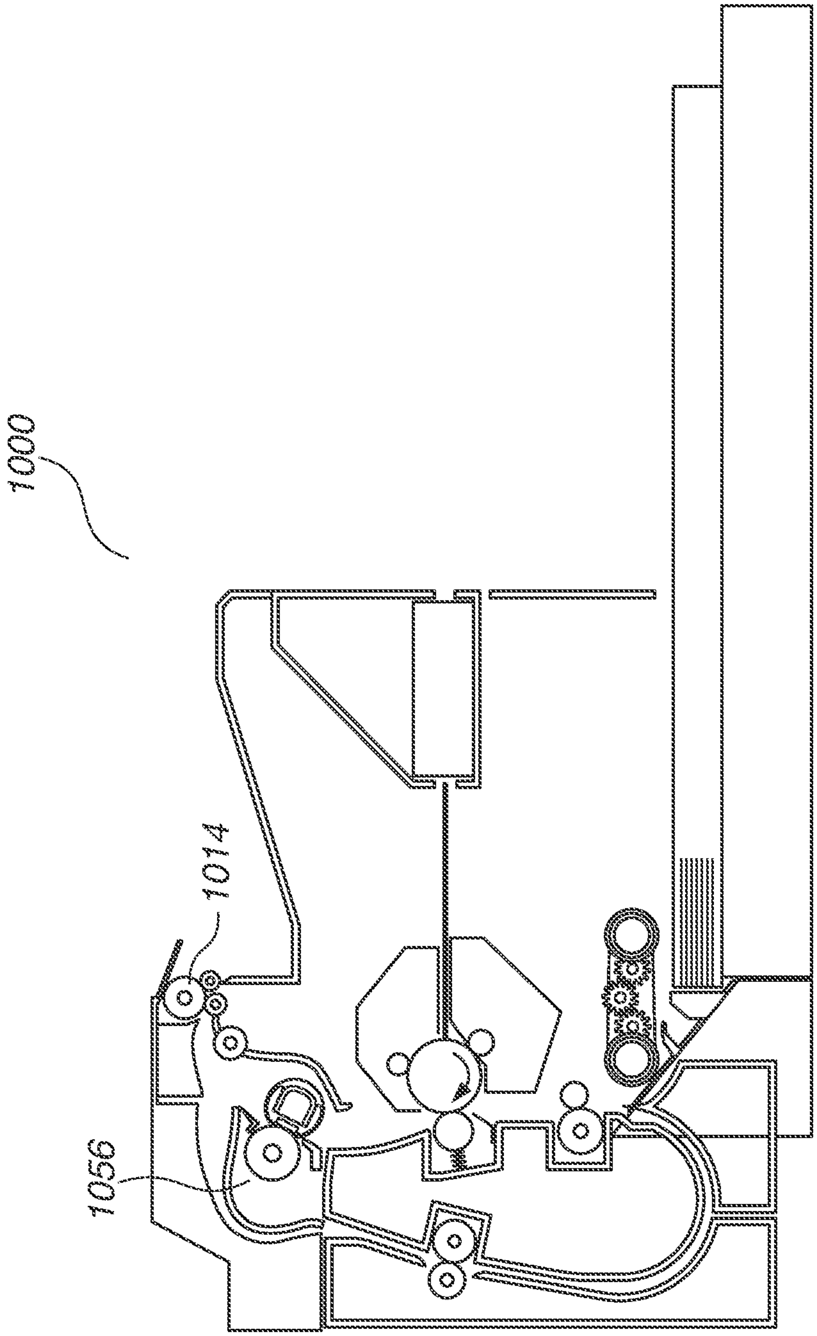
FIG. 9 is a schematic configuration diagram illustrating an image forming apparatus.

FIG. 8B illustrates a state after the recording material S is further conveyed from the state illustrated in FIG. 8A, and the leading end of the recording material S is guided by the inclined plane B of the after-fixing upper guide 102 to the paper discharge nip portion. As illustrated in the exemplary embodiments described above, the recording material S is in a state of forming slack between the fixing portion 56 and the paper discharge portion 55.

The present exemplary embodiment is provided with the roller 304 capable of performing swinging motion in addition to the rollers 103 fixed to the after-fixing guide 101. A movable range of the roller 304 is restricted by the stopper to the position K33 illustrated in FIG. 8B. At the position K33, the roller 304 is configured to support the surface of the recording material S together with the rollers 103. That is, the surface of the recording material S is in a state of being supported by the triangle plane formed by the two rollers 103 in the first stage and the one roller 304 in the second stage. This configuration prevents the slack of the recording material S from becoming too large, and can thereby prevent the surface of the recording material S from rubbing against the after-fixing upper guide 102.

In this manner, the description has been given of the configuration in which the roller 304 capable of performing swinging motion operates so as to slide over a straight line. Also in such a configuration, with the arrangement of a plurality of rollers 103 fixed to the after-fixing guide 101 in the longitudinal direction, the roller 304 that comes into contact with the recording material S more on the downstream side than the rollers 103 in the conveyance direction of the recording material S and that is capable of performing swinging motion can guide the recording material S. Hence, the configuration prevents occurrence of a conveyance malfunction and degradation of image quality and enables conveyance of the recording material S to the paper discharge portion 55 similarly to the first and second exemplary embodiments described above.

The present exemplary embodiment also has a two-stage configuration composed of the first stage of the fixed rollers 103 and the second stage of the roller 304 capable of performing swinging motion, similarly to the first and second exemplary embodiments described above. The configuration can support the surface of the recording material S with the plane formed by these rollers, and can thereby prevent the slack between the fixing portion 56 and the paper discharge portion 55 from becoming too large and prevent the recording material S from rubbing against the after-fixing upper guide 102. Hence, the configuration can prevent occurrence of the image scratch on thick paper having high stiffness. In addition, since the configuration has the roller 304 capable of performing swinging motion in the second stage, thin paper having low stiffness is conveyed in the trajectory S1 as illustrated in FIG. 8A. Thus, the configuration can prevent the entry angle of the recording material S to enter the after-fixing upper guide 102 from becoming too large and prevent occurrence of a jam. Additionally, since only the rollers 103 and the roller 304 are configured to come into contact with the image forming area of the recording material S, the configuration can also prevent occurrence of an image scratch by the rib 105 of the after-fixing guide 101. Also in the present exemplary embodiment, the position of the rollers in the longitudinal direction and the number of rollers can be set as appropriate in accordance with the following conditions. The conditions include a size of the whole of the image forming apparatus 50, an angle of the fixing nip tangent line LNip, an angle of the fixing discharge line Lp, a height and angle of the rib 105 of the after-fixing guide 101, and a basis weight of corresponding paper.

The configuration of the present disclosure prevents occurrence of a conveyance malfunction and degradation of image quality and enables conveyance of the recording material from the fixing device to the paper discharge roller.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

an image forming unit configured to form an image on a recording material;

a fixing unit configured to fix the image that has been formed by the image forming unit onto the recording material;

a rotating member configured to come into contact with the recording material onto which the image has been fixed and guide the recording material, and configured to be driven to rotate by conveyance of the recording material; and a first guide unit arranged more on a downstream side than the rotating member in a conveyance direction of the recording material and configured to guide the recording material to a discharge unit configured to discharge the recording material to an outside of the image forming apparatus, wherein the rotating member is configured to perform swinging motion by coming into contact with the recording material, wherein the first guide unit includes a first guide surface on an upstream side and a second guide surface on the downstream side in the conveyance direction of the recording material, and wherein the first guide surface is inclined upward downstream in the conveyance direction of the recording material, and the second guide surface is inclined downward downstream in the conveyance direction of the recording material.

2. The image forming apparatus according to claim 1, further comprising a second guide unit configured to come into contact with the recording material onto which the image has been fixed by the fixing unit and to change the conveyance direction of the recording material from a first conveyance direction in which the recording material is conveyed to the fixing unit to a second conveyance direction in which the recording material is conveyed to the rotating member.

3. The image forming apparatus according to claim 1, further comprising a support unit configured to support the rotating member, wherein the support unit is capable of performing swinging motion about a pivot axis on a circular arc.

4. The image forming apparatus according to claim 1, wherein the rotating member performs swinging motion and moves to the downstream side in the conveyance direction by coming into contact with the recording material.

5. The image forming apparatus according to claim 4, wherein the rotating member performs the swinging motion by a first movement amount and moves to a first position upon coming into contact with a first recording material having a first thickness, and the rotating member performs the swinging motion by a second movement amount smaller than the first movement amount and moves to a second position upon coming into contact with a second recording material having a second thickness smaller than the first thickness.

6. The image forming apparatus according to claim 1, further comprising a detection unit configured to detect presence or absence of the recording material depending on swinging motion of the rotating member.

7. The image forming apparatus according to claim 1, further comprising a support unit configured to support the rotating member, wherein the rotating member and the support unit perform swinging motion on a straight line.

8. The image forming apparatus according to claim 7, wherein the rotating member performs the swinging motion by a third movement amount and moves to a third position upon coming into contact with a first recording material having a first thickness, and the rotating member performs the swinging motion by a fourth movement amount smaller than the third movement amount and moves to a fourth position upon coming into contact with a second recording material having a second thickness smaller than the first thickness.

* * * * *